(12) United States Patent
Sugita et al.

(10) Patent No.: US 9,857,645 B2
(45) Date of Patent: Jan. 2, 2018

(54) DISPLAY PANEL, DISPLAY APPARATUS, AND MANUFACTURING METHOD

(71) Applicant: Sharp Kabushiki Kaisha, Osaka-shi, Osaka (JP)

(72) Inventors: Yasuhiro Sugita, Osaka (JP); Iichiroh Inoue, Osaka (JP); Noriaki Yamaguchi, Osaka (JP); Akiko Miyazaki, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 396 days.

(21) Appl. No.: 14/427,702

(22) PCT Filed: Sep. 10, 2013

(86) PCT No.: PCT/JP2013/074390
§ 371 (c)(1),
(2) Date: Mar. 12, 2015

(87) PCT Pub. No.: WO2014/042152
PCT Pub. Date: Mar. 20, 2014

(65) Prior Publication Data
US 2015/0248034 A1    Sep. 3, 2015

(30) Foreign Application Priority Data
Sep. 14, 2012    (JP) .................................. 2012-203616

(51) Int. Cl.
*G02F 1/1334*    (2006.01)
*G02F 1/137*    (2006.01)
(Continued)

(52) U.S. Cl.
CPC .......... *G02F 1/13439* (2013.01); *G02F 1/137* (2013.01); *G02F 1/1333* (2013.01);
(Continued)

(58) Field of Classification Search
CPC ............................... G02F 1/1334; G02F 1/137
See application file for complete search history.

(56) References Cited

U.S. PATENT DOCUMENTS

| 2010/0134397 A1* | 6/2010 | Ishitani | G02F 1/133514 345/92 |
| 2010/0245700 A1* | 9/2010 | Zhao | G02F 1/13624 349/48 |

(Continued)

FOREIGN PATENT DOCUMENTS

| JP | 2007-336368 A | 12/2007 |
| JP | 2009-520245 A | 5/2009 |

(Continued)

OTHER PUBLICATIONS

Official Communication issued in International Patent Application No. PCT/JP2013/074390, dated Oct. 15, 2013.

*Primary Examiner* — Nathanael R Briggs
*Assistant Examiner* — Alexander Gross
(74) *Attorney, Agent, or Firm* — Keating & Bennett, LLP

(57) ABSTRACT

For the purpose of providing a display panel that realizes a high light utilization efficiency, a low power consumption, a fast response and a low cost, a display panel of the present invention includes, between a transparent substrate (102) and a TFT substrate (105), (i) a soft material layer (101) that expands or contracts in response to voltage application to the soft material layer (101), (ii) a flexible pixel electrode (102) that expands or contracts together with the soft material layer (101), and (iii) an upper electrode (103).

9 Claims, 13 Drawing Sheets

(51) Int. Cl.
   *G02F 1/1343*   (2006.01)
   *G09G 3/36*     (2006.01)
   *G02F 1/133*    (2006.01)
   *G02F 1/1333*   (2006.01)
   *G02F 1/1335*   (2006.01)
   *G02F 1/1362*   (2006.01)
   *G02F 1/1368*   (2006.01)

(52) U.S. Cl.
   CPC .......... *G02F 1/1334* (2013.01); *G02F 1/1368* (2013.01); *G02F 1/13306* (2013.01); *G02F 1/133514* (2013.01); *G02F 1/136286* (2013.01); *G09G 3/3648* (2013.01); *G09G 2300/023* (2013.01); *G09G 2300/0404* (2013.01); *G09G 2300/0426* (2013.01); *G09G 2320/0252* (2013.01)

(56) References Cited

U.S. PATENT DOCUMENTS

| | | | | |
|---|---|---|---|---|
| 2011/0019993 A1* | 1/2011 | Chou | ....................... | G03B 9/02 396/505 |
| 2012/0026150 A1* | 2/2012 | Katayama | .................. | G02F 1/17 345/211 |
| 2012/0133690 A1* | 5/2012 | Katayama | .............. | G02B 26/02 345/690 |

FOREIGN PATENT DOCUMENTS

| | | | |
|---|---|---|---|
| WO | 2007/075832 | A2 | 7/2007 |
| WO | 2011/016265 | A1 | 2/2011 |

\* cited by examiner

FIG. 7
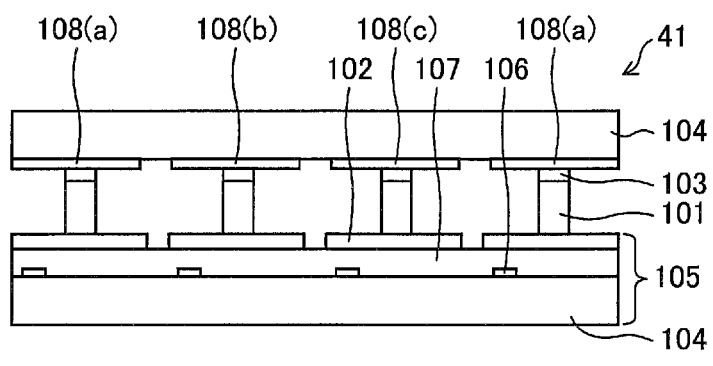
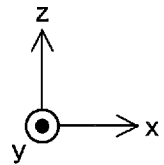

FIG. 11

| Materials | | Drive principles | Characteristics | Problems |
|---|---|---|---|---|
| Polymer material | Hydrogel Organogel | Heat, light, electricity, pH | High expansion/contraction High shape retention | Improvement of responsiveness Improvement of durability |
| | Ion conducting polymer (Polyelectrolyte gel) | Electricity | Fast response Low voltage | Improvement of generating force Driving in air |
| | Conductive polymer | Electricity | Fast response | Driving in air |
| | Carbon nanotube (Bucky gel) | Electricity | Fast response High durability | |
| | Piezoelectric polymer | Electricity | Fast response | Improvement of generating force and expansion/contraction ratio |
| | Electrostrictive polymer | Electricity | Fast response | Reduction of applied voltage |
| Shape-memory material | Shape-memory alloy | Heat, electricity | High generating force Easy to configure high expansion/contraction structure | Improvement of responsiveness and energy efficiency |
| Pneumatic | Mckibben type | Air | Good balance between generating force and expansion/contraction | Necessity of external driving device |
| | Longitudinal fiber-reinforced type | Air | High output/high contraction ratio High contraction force | Necessity of external driving device |
| Electrostatic force | EAP (Dielectric polymer) | Electricity | Fast response, high expansion/contraction Transparency | |

DISPLAY PANEL, DISPLAY APPARATUS, AND MANUFACTURING METHOD

TECHNICAL FIELD

The present invention relates to a display panel for displaying an image, a display device including the display panel, and a method for producing the display device for displaying an image.

BACKGROUND ART

In recent years, there has been a demand for a technique for reducing a power consumption of a liquid crystal display device. A widely known liquid crystal display device displays an image by use of a display panel that includes a polarizer that polarizes light from a light source and a liquid crystal whose orientation changes in response to voltage application. When the light from the light source passes through the polarizer, the light attenuates and as a result, light utilization efficiency deteriorates. On this account, a liquid crystal display device which does not require a polarizer is being developed so that light utilization efficiency is improved and a power consumption is reduced.

For example, Patent Literature 1 discloses, as a technique for solving the above problem, a technique in which an aperture ratio of a display panel is controlled by use of liquid crystal elastomer whose shape changes in response to voltage application (see FIG. 14).

CITATION LIST

Patent Literature

[Patent Literature 1]
WO-2011-016265-A1

SUMMARY OF INVENTION

Technical Problem

Although the display panel of Patent Literature 1 makes it possible to improve light utilization efficiency and reduce a power consumption, there still is a room for improvement in response speed. Further, in the display panel of Patent Literature 1, a highly-precise liquid crystal orientation control is required. This complicates a production process.

The present invention is attained in view of the above problems. A main object of the present invention is to provide a display panel whose light utilization efficiency and response speed are improved while complication of a production process is avoided.

Solution to Problem

In order to solve the above problems, a display device according to one aspect of the present invention includes: a plurality of gate bus lines; a plurality of source bus lines; and display elements each provided in a pixel area defined by given gate bus lines out of the plurality of gate bus lines and given source bus lines out of the plurality of source bus lines, the display elements each including: a transistor including a gate connected to one of the given gate bus lines, and a source connected to one of the given source bus lines; a first electrode connected to a drain of the transistor; a soft material provided in contact with the first electrode, the soft material expanding or contracting in accordance with a voltage applied to the soft material; and a second electrode provided so as to be combined with the soft material, the second electrode being provided on a side of the soft material which side is opposite to another side where the soft material is in contact with the first electrode.

Advantageous Effects of Invention

According to one aspect of the present invention, it is possible to provide a display panel that realizes a high light utilization efficiency, a low power consumption, and a fast response.

BRIEF DESCRIPTION OF DRAWINGS

FIG. 7 is a view illustrating a configuration of a case where color filters are provided in a display panel according to the first embodiment of the present invention.

FIG. 11 is a chart showing general artificial muscles (EAPs) which are classified depending on respective materials, and a driving principal(s), a characteristic(s), and a problem(s) of each of the general artificial muscles.

DESCRIPTION OF EMBODIMENTS

<First Embodiment>

The following discusses a display panel according to the first embodiment of the present invention, a display device including the display panel, and an electronic apparatus including the display device, with reference to FIGS. 1 through 7.

(Electronic Apparatus)

Figure 4:
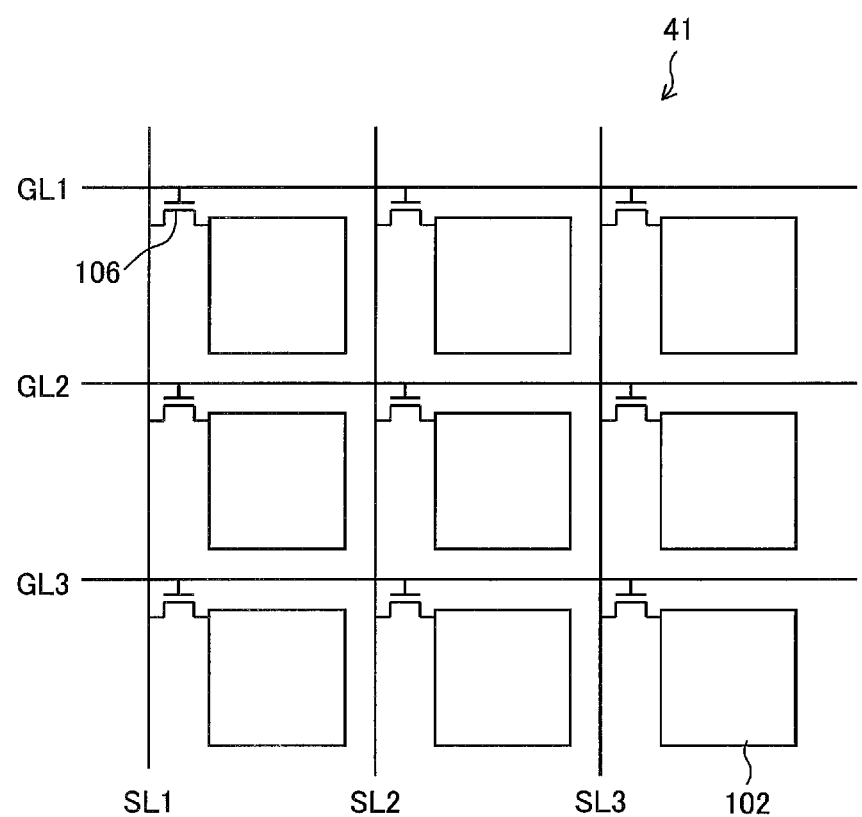
FIG. 4 is a view illustrating an active matrix structure of a display panel, according to the first embodiment of the present invention, which includes a plurality of display elements.
Figure 5:
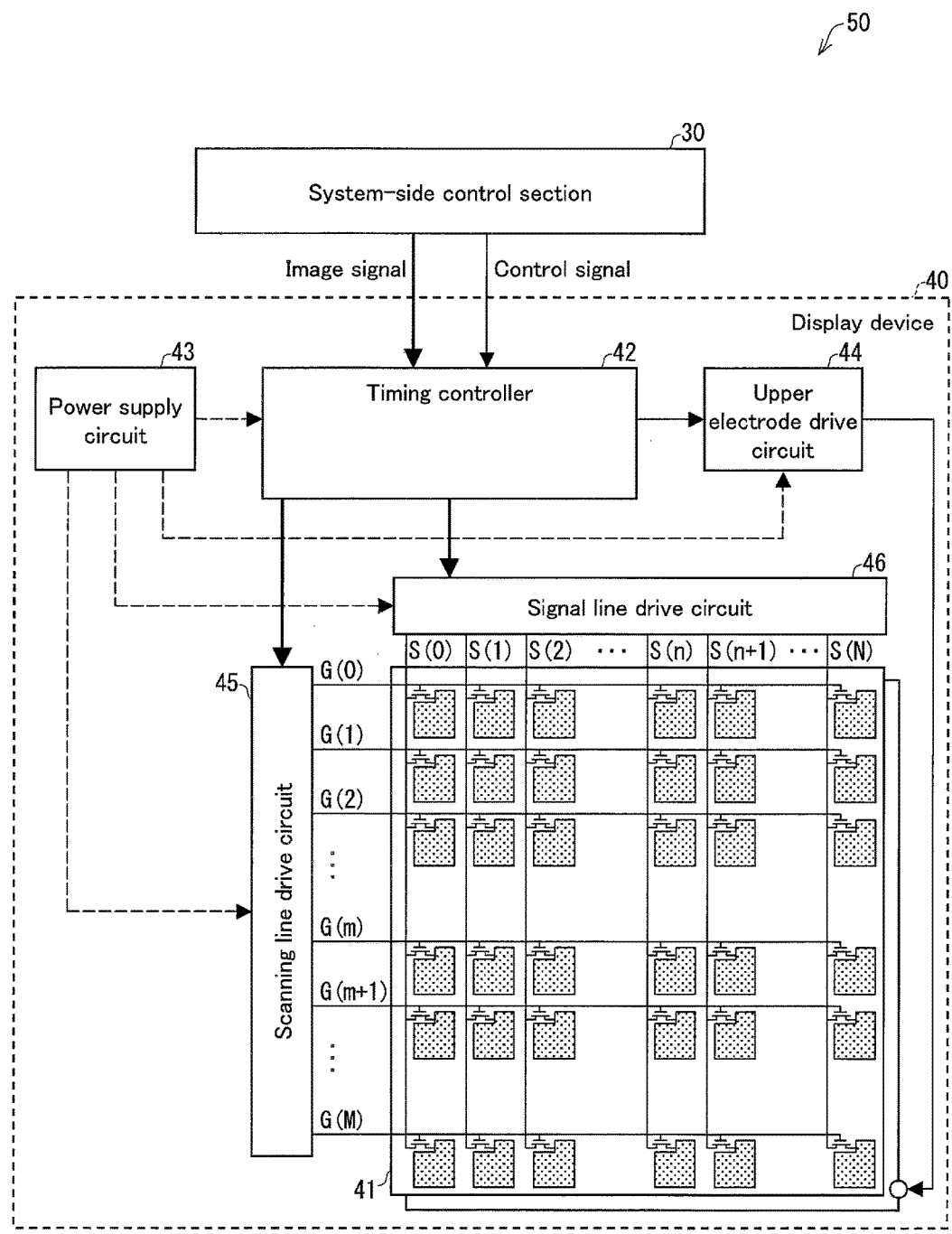
FIG. 5 is a view illustrating an entire configuration of a display device that includes a display panel according to the first embodiment of the present invention and an electronic apparatus that includes the display device.

The following discusses in detail an electronic apparatus 50 which includes the display panel 41 according to the first embodiment, with reference to FIGS. 4 and 5. Note that the electronic apparatus can be any electronic apparatus including a display device that displays an image, and not specifically limited. As such an electronic apparatus, for example, a mobile phone, a smart phone, a PDA (portable information terminal), an electronic book, a lap-top computer, etc. can be used.

FIG. 4 is a schematic view illustrating an active matrix structure of the display panel 41 which includes a plurality of display elements (pixels) 10.

The display panel 41 includes a plurality of pixels, a plurality of gate signal lines (gate bus lines) G, and a plurality of source signal lines (data bus lines, source bus lines) S.

The plurality of pixels are defined by the plurality of gate signal lines G and the plurality of source signal lines S. The plurality of pixels are arranged in what is known as a grid pattern made up of a plurality of pixel columns and a plurality of pixels rows.

The plurality of gate signal lines G are provided in parallel with one another in a pixel-column direction (i.e. a direction along the plurality of pixel columns). Each of the plurality of gate signal lines G is electrically connected to gates of TFTs 106 that are provided in respective pixel elements 10 of a corresponding one of the plurality of pixel rows.

The plurality of source signal lines S are (i) arranged in parallel with one another in a pixel-row direction (i.e. a direction along the plurality of pixel rows) and (ii) each orthogonal to each of the plurality of gate signal lines G. Each of the plurality of source signal lines S is electrically connected to sources of TFTs 106 that are provided in respective display elements 10 of a corresponding one of the plurality of pixel columns.

Next, the following discusses a configuration example of the electronic apparatus 50 according to the first embodiment, with reference to FIG. 5. FIG. 5 is a view illustrating an entire configuration of the electronic apparatus 50 according to the first embodiment.

As illustrated in FIG. 5, the electronic apparatus 50 includes a display device 40 and a system-side control section (control device) 30. Further, as illustrated in FIG. 5, the display device 40 includes a display panel 41, a timing controller (control section) 42, a power supply circuit 43, an upper electrode drive circuit 44, a scanning line drive circuit 45, and a signal line drive circuit 46.

In the first embodiment, an active-matrix display device is employed as the display device 40. Accordingly, the display panel 41 of the first embodiment is an active-matrix display panel and the other constituent members as described above are members for controlling this display panel.

In an example illustrated in FIG. 5, the display panel 41 includes the plurality of pixels of N columns by M rows, and, accordingly, includes N source signal lines S and M gate signal lines G.

(Scanning Line Drive Circuit)

The scanning line drive circuit 45 sequentially selects and scans the plurality of gate signal lines G. Specifically, the scanning line drive circuit 45 (i) sequentially selects the plurality of gate signal lines G and (ii) supplies, to thus selected gate signal line G, an on-voltage for turning on switching elements (TFTs) provided in respective pixels connected to the selected gate signal line G.

(Signal Line Drive Circuit)

While any given gate signal line G is being selected, the signal line drive circuit 46 supplies source signals (that correspond to image data) to pixels connected to the selected gate signal line G via source signal lines S that correspond to the respective pixels. Specifically, the signal line drive circuit 46 (i) calculates, based on an inputted image signal, a value of voltage to be supplied to each of the pixels connected to the selected gate signal line G and then (ii) supplies the voltage of the value to each of the source signal lines S via a source output amplifier. This causes a source signal to be supplied to and written into each of the pixels connected to the selected gate signal line G.

(Upper Electrode Drive Circuit)

The upper electrode drive circuit 44 supplies, to an upper electrode provided for the plurality of pixels, a predetermined voltage for driving the upper electrode.

(Timing Controller)

The timing controller 42 receives an image signal and a control signal from a system-side control section 30. The image signal here includes a clock signal, a sync signal, an image data signal, and the like. Note that the image can be a moving image or a static image.

Then, the timing controller 42 supplies, to the drive circuits, various control signals for causing the drive circuits to operate in synchronization with one another (see solid arrows shown in FIG. 5).

For example, the timing controller 42 supplies, to the scanning line drive circuit 45, (i) a gate start pulse signal, (ii) a gate clock signal GCK, and (iii) a gate output control signal GOE. When receiving the gate start pulse signal, the scanning line drive circuit 45 starts scanning the plurality of gate signal lines G. Then, in accordance with the gate clock signal GCK and the gate output control signal GOE, the scanning line drive circuit 45 sequentially supplies on-voltages to the respective gate signal lines G.

The timing controller 42 supplies, to the signal line drive circuit 46, (i) a source start pulse signal, (ii) a source latch strobe signal, and (iii) a source clock signal. In response to the source start pulse signal thus received, the signal line drive circuit 46 stores inputted image data of each pixel in a register in accordance with the source clock signal. Then, in response to the source latch strobe signal thus received, the signal line drive circuit 46 supplies, to each of the source signal lines S, a source signal corresponding to the image data.

(Power Supply Circuit)

The power supply circuit 43 supplies a voltage to the scanning line drive circuit 45, the signal line drive circuit 46, and the upper electrode drive circuit 44 (see dotted arrows shown in FIG. 5).

(System-Side Control Section)

The system-side control section 30 supplies, to the timing controller 42 provided in the display device 40, an image signal and a control signal.

(Regarding Display Element)

Figure 1:
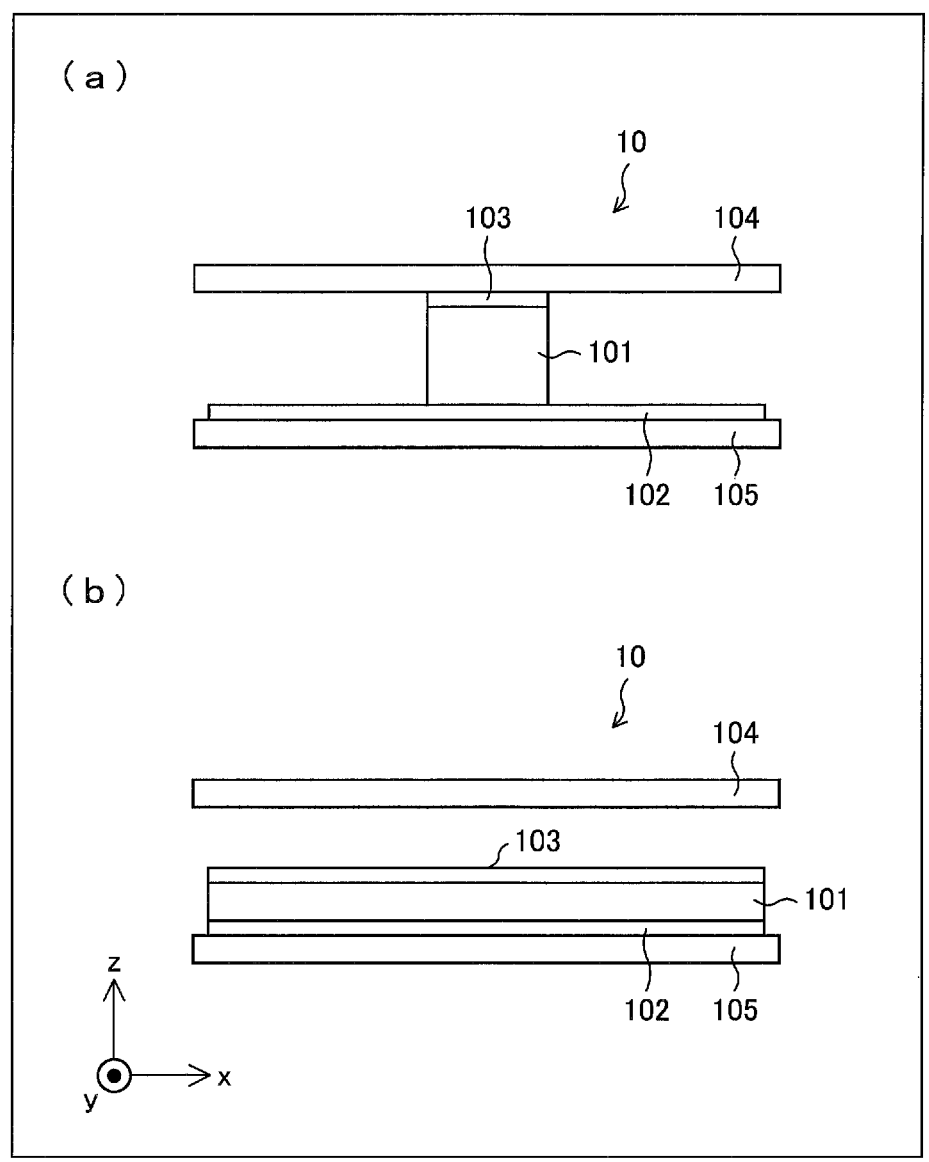
FIG. 1 is a view illustrating a configuration of a display element (pixel) provided in a display panel according to the first embodiment of the present invention.

Next, the following discusses the display elements (pixels) 10 provided in the display panel 41 according to the first embodiment. FIG. 1 is a cross sectional view schematically illustrating a configuration of a display element 10 provided in the display panel 41 according to the first embodiment.

In the following description, as illustrated in (a) of FIG. 1, a horizontal direction of the display element 10 and the display panel 41 is defined as an x-axis direction, while a vertical direction of the display panel 41 is defined as a z-axis direction. Moreover, a direction perpendicular to an xy plane is defined as a y-axis direction. Further, a side of the display panel 41 on which side light for presenting an image is emitted from the pixels is referred to as a front side. On the other hand, a side of the display panel 41 opposite to the front side of the display panel 41 along the z-axis is referred to as a back side. Inside the display element 10, a side corresponding to the front side is referred to as an upper side and a side corresponding to the back side is referred to as a lower side.

As illustrated in (a) of FIG. 1, the display element 10 includes a soft material layer 101, a pixel electrode 102, an upper electrode 103, a transparent substrate 104 and a TFT substrate 105. The soft material layer 101, the pixel electrode 102, and the upper electrode 103 are provided between the transparent substrate 104 and the TFT substrate 105.

The upper electrode 103 is connected to an upper electrode line (also referred to as a common-electrode bus line) (not illustrated). To this upper electrode line, a voltage is applied by the upper electrode drive circuit 44.

Note that in the first embodiment, the soft material layer 101 is transparent. In other words, the soft material layer 101 has an optical transmittance that is equal to or higher than a predetermined optical transmittance. However, the first embodiment is not limited to this configuration. The soft material layer 101 can alternatively be non-transparent. In other words, even in a case where a non-transparent soft material layer 101 is employed, an aperture ratio can be controlled by changing as appropriate a voltage applied to the soft material layer 101.

(Regarding Light Source of Display Device)

Figure 6:
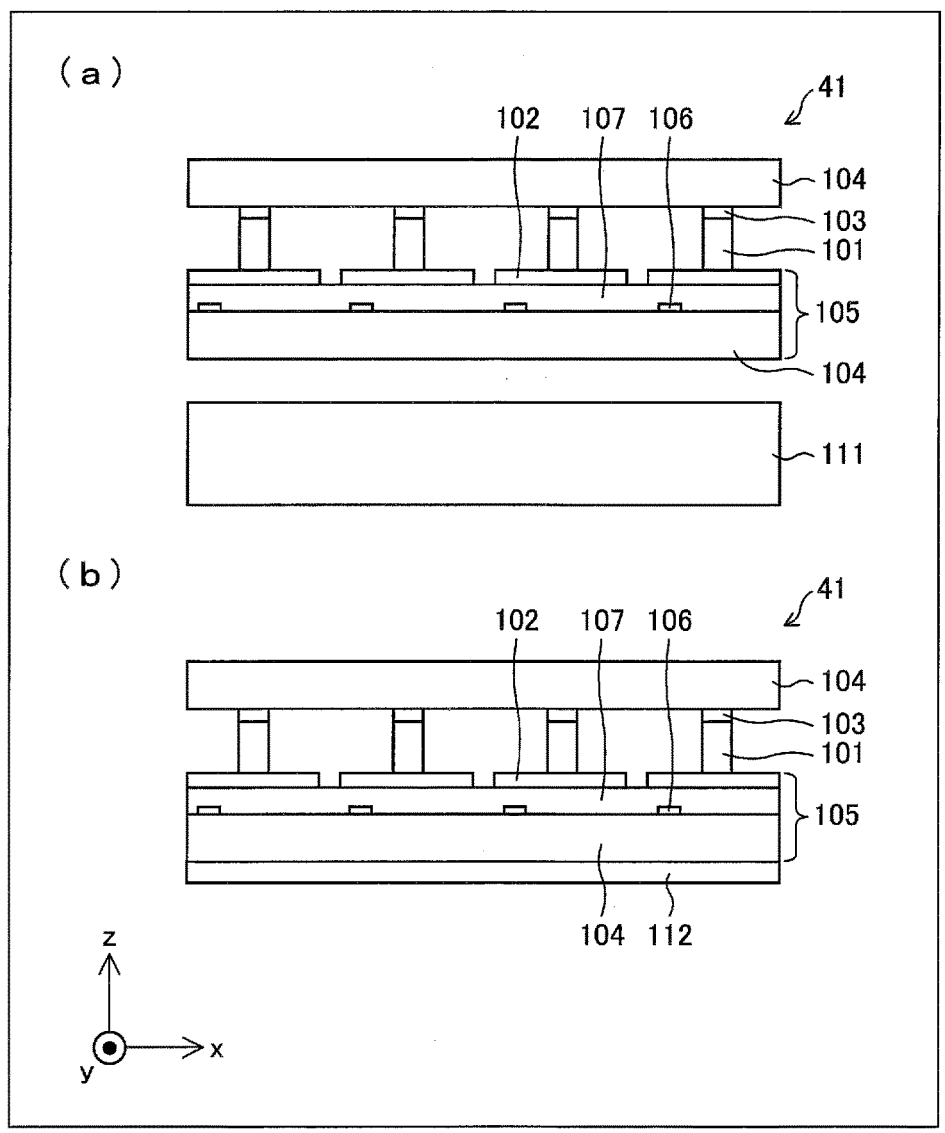
FIG. 6 is a view illustrating a configuration of (a) a light source or a reflector and (b) a display panel which are provided in a display device according to the first embodiment of the present invention.

In an example illustrated in FIG. 1, the display device 40 includes a light source (not illustrated) on the back side of the display panel 41. The display element 10 transmits or blocks light from the light source and thereby causes an image to be displayed on the front side of the display panel 41 (transmissive type). (a) of FIG. 6 is a view illustrating a configuration of a transmissive-type display panel 41. As illustrated in (a) of FIG. 6, the display device 40 includes a backlight module 111 on the back side of the display panel 41, and uses this backlight module 111 as a light source for the display element 10.

Further, the display panel 41 may be configured to include a reflector on the back side, in place of the above-described light source. In this case, light having entered from the front side of the display panel 41 is reflected by the reflector toward the front side. In this case, the display element 10 transmits or blocks the light reflected as above, and thereby causes an image to be displayed on the front side of the display panel 41 (reflection type). (b) of FIG. 6 is a view illustrating a configuration of a reflection-type display panel 41. As illustrated in (b) of FIG. 6, the display device 40 includes a reflector 112 on the back side of the display panel 41. In this case, the display device 40 uses, as a light source of the display panel 41, light having been transmitted from the front side of the display panel 41 and then reflected by the reflector 112.

The first embodiment discusses a transmissive-type display panel. However, the first embodiment is not limited to this configuration. The first embodiment can alternatively employ a reflection-type display panel.

(Regarding Behavior of Soft Material)

As illustrated in (b) of FIG. 1, the soft material layer 101 is provided so as to be in contact with an upper side of the pixel electrode 102. The soft material layer 101 expands or contracts in a horizontal direction relative to the transparent substrate 104 (a direction parallel to the xy plane) in response to a voltage applied to the soft material layer 101 (a potential difference between a voltage applied to the upper electrode 103 and a voltage applied to the pixel electrode 102), while keeping a substantially constant volume.

On an upper side of the soft material layer 101, the upper electrode 103 is provided. This upper electrode 103 is flexible, and expands or contracts together with the soft material layer 101 in accordance with expansion or contraction of the soft material layer 101. In an example illustrated in FIG. 1, a black dye electrode is used as the upper electrode 103. The following discusses a configuration where no color filter is provided, but it is also possible to employ a configuration where a color filter as described later is provided.

As illustrated in (a) of FIG. 1, in a state in which no voltage is applied to the display element 10 (in a normal state, when a power supply is off), the soft material layer 101 and the upper electrode 103 each have a minimum cross sectional area of a cross section parallel to the xy plane. Accordingly, an aperture ratio of the display element 10 becomes maximum and consequently, brightness of an image displayed by the display element 10 becomes maximum. In this way, the display panel according to the first embodiment including the display element 10 is a normally white display panel whose aperture ratio becomes maximum in a state where no voltage is applied.

On the other hand, as illustrated in (b) of FIG. 1, in a state in which a voltage that causes a maximum deformation of the soft material layer 101 is applied to the display element 10 (when a voltage is applied), the soft material layer 101 and the upper electrode 103 each have a maximum cross sectional area of the cross section parallel to the xy plane. Accordingly, light to pass through the display element 10 is blocked and consequently, brightness of an image displayed by the display element 10 becomes minimum.

A deformation amount of the soft material layer 101 provided in the display element 10 varies in accordance with a value of voltage applied to the display element 10. The signal line drive circuit 46 applies, to the display element 10 via a corresponding source signal line S, a voltage of a value calculated based on an inputted image signal. Accordingly, when an image having a desired brightness is to be displayed, a voltage in accordance with the desired brightness should be applied.

Patent Literature 1 discloses a display panel in which liquid crystal elastomer is utilized. However, a deformation amount of the liquid crystal elastomer is approximately 20% at the maximum. Therefore, an aperture ratio has been small and it has been difficult to control a gray scale presentation. On the other hand, in the first embodiment, the aperture ratio of the display panel 41 is controlled by controlling expansion and contraction of the soft material layer 101. The soft material layer 101 includes the upper electrode 103 that expands or contracts together with the soft material layer 101. This allows efficient voltage application to the soft material layer 101 and consequently makes it possible to expand or contract the soft material layer 101 to a large extent. Therefore, in the display panel according to the first embodiment, it is possible to improve a gray scale presentation of an image which the display panel 41 displays.

(Regarding Display Panel)

Figure 2:
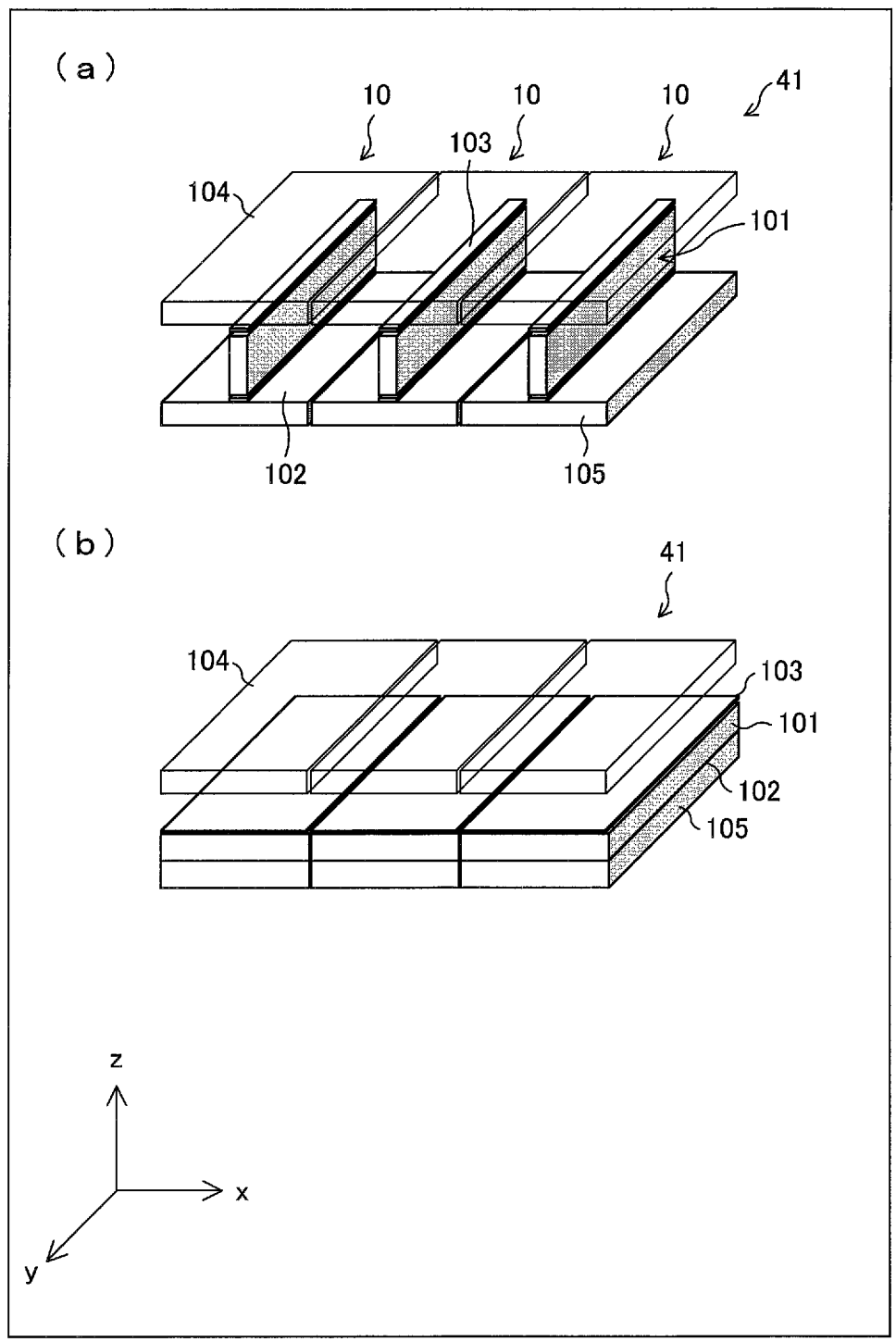
FIG. 2 is a view illustrating a configuration of a display panel, according to the first embodiment of the present invention, which includes a plurality of display elements.

(a) of FIG. 2 is a perspective view schematically illustrating the display panel 41 including the plurality of display elements 10. (a) of FIG. 2 shows only three adjacent display elements 10 out of the plurality of display elements 10. As illustrated in (a) of FIG. 2, each of the plurality of display elements 10 are provided with soft material layers 101, respectively, and also with upper electrodes 103, respectively.

As illustrated in (b) of FIG. 2, when a voltage is applied to each of the soft material layers 101 via the pixel electrode 102 and the upper electrode 103, each of the soft material layers 101 expands in a direction parallel to the xy plane while keeping a constant volume.

Figure 3:
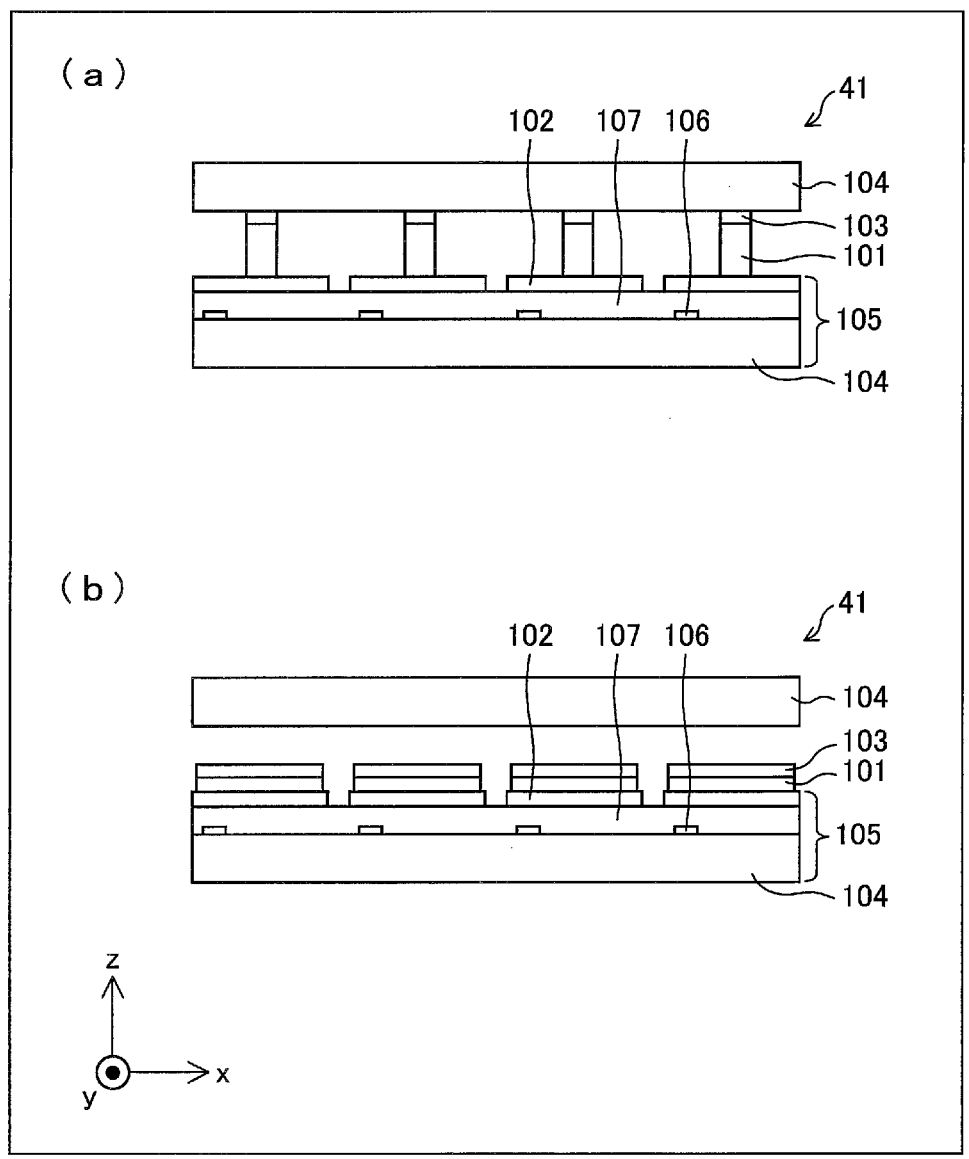
FIG. 3 is a view illustrating a configuration of a display panel, according to the first embodiment of the present invention, which includes a plurality of display elements.

FIG. 3 is a cross sectional view schematically illustrating a configuration of the display panel 41 including the plurality of display elements 10. FIG. 3 illustrates four adjacent display elements 10 out of the plurality of display elements 10. The pixel electrode 102 and a drain of a TFT 106 illustrated in (a) of FIG. 3 are electrically connected to each other via a contact hole (not illustrated) that is provided in an insulating film 107.

As illustrated in (b) of FIG. 3, when a voltage is applied to each of the soft material layers 101, the soft material layers 101 each expand in a direction parallel to the xy plane. The display panel 41 controls an aperture ratio of each of the display elements 10, by utilizing expansion and contraction of a corresponding one of the soft material layers 101 which expansion or contraction is caused by voltage application. This makes it possible to change a display image. In this case, each image for one pixel which image is to be displayed by each of the display elements 10 can be made to differ from each other, by individually setting a voltage to be applied to each of the soft material layers 101.

(Regarding EAP)

In the first embodiment, an artificial muscle EAP is used as the soft material layer 101. FIG. 11 is a chart showing general artificial muscles (EAPs) which are classified depending on materials, and a driving principal(s), a characteristic(s), and a problem(s) of each of the general artificial muscles. A dielectric polymer EAP has transparency in addition to a fast response characteristic and a high expansion and contraction characteristic. Therefore, the dielectric polymer EAP is suitable for a material of the soft material layer 101 of the display element 10.

Figure 12:
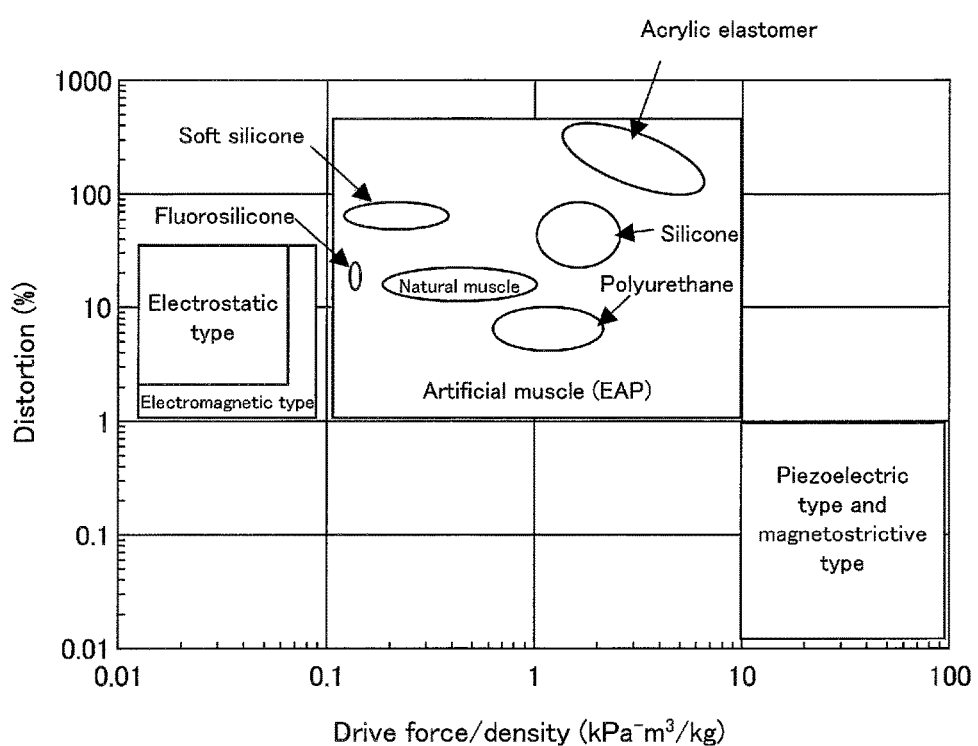
FIG. 12 is a chart illustrating a relation between a drive force/density and a deformation (distortion) amount of each general dielectric polymer EAP.

FIG. 12 is a chart showing a relation between a drive force/density and a deformation (distortion) amount of each of general EAPs.

As shown in FIG. 12, an acrylic elastomer that is an EAP has a maximum deformation amount of 400%. This deformation amount is greater than those of other materials. Further, the acrylic elastomer has a deformation response characteristic of 50 kHz or higher and accordingly, can make a fast response.

In the first embodiment, an IGZO TFT is used as the TFT 106 so that it becomes possible to apply a high voltage that is required to increase a deformation amount of the EAP.

(Regarding IGZO)

Figure 13:
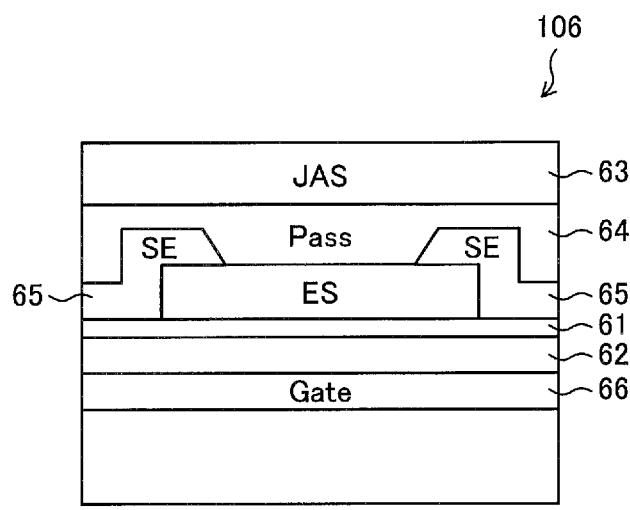
FIG. 13 is a view illustrating a structure of an IGZO TFT.
Figure 14:
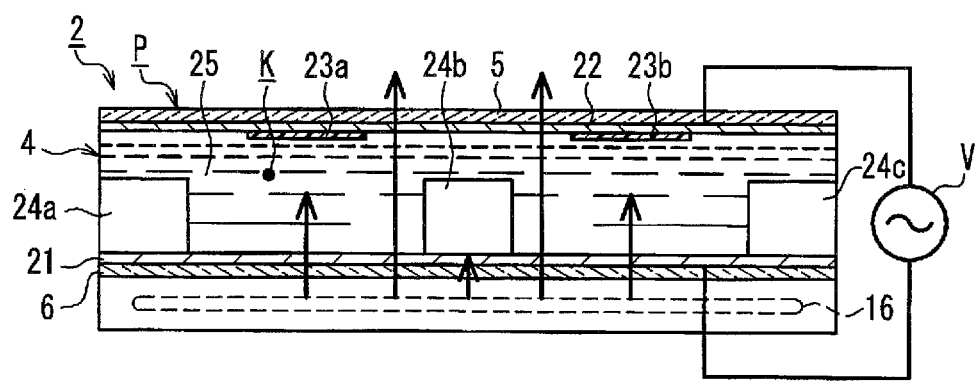
FIG. 14 is a view illustrating a configuration of a display element provided with a liquid crystal elastomer in a conventional technique.

IGZO (registered trademark) is one kind of oxide semiconductor and has a composition formula of InGaZnOx. The IGZO TFT is a TFT in which IGZO is used as an oxide semiconductor. FIG. 13 is a cross sectional view schematically illustrating a structure of the IGZO TFT. As illustrated in FIG. 13, the IGZO TFT includes an oxide semiconductor 61 (InGaZnO oxide semiconductor), a gate insulating film 62, a transparent insulating film 63, a Pass 64, a source electrode 65, an etching stopper 66, and a Gate 67.

As compared to an Si TFT, the IGZO TFT has the following characteristics. That is, as compared to an Si TFT, the IGZO TFT has a higher bandgap (Si TFT: 1.2 eV, IGZO TFT: approximately 3.3 eV), and therefore has a higher junction withstand voltage. Accordingly, a higher voltage can be applied. This makes it possible to improve display performance, in particular, a moving-image performance and a gray scale presentation. Further, the higher bandgap results in an excellent off-state leakage characteristic. This allows an ultra-low frequency drive (0.01 Hz), and consequently makes it possible to drastically reduce a power consumption for display drive in static-image application, such as a digital book, or at the time when a homepage similar to a static image is viewed. Furthermore, as compared to amorphous Si, IGZO has a higher mobility that is an indicator indicative of mobility of electrons. This makes it possible to reduce a transistor size and accordingly, increase an aperture ratio. Meanwhile, the number of masks required for production is approximately 10 for a polysilicon TFT, for example, while 3 to 5 for the IGZO TFT. This means that process cost is low for the IGZO TFT and therefore, a high-performance display can be realized at low cost. In addition, a size of a screen made with use of the IGZO TFT can be easily increased as compared to a polysilicon TFT because no laser annealing is required for the IGZO TFT.

In an example illustrated in FIG. 3, an acrylic elastomer that is an artificial muscle EAP is used as the soft material layer 101. This realizes a fast response of the soft material layer 101. Further, by use of the IGZO TFT as the TFT 106, application of a high voltage is realized. The above configuration makes it possible to realize display of a moving image that requires fast display and also to improve an aperture ratio and a gray scale presentation of each display element. Further, by the ultra-low frequency drive, it is possible to reduce a power consumption in display driving. Consequently, an extremely-low-power-consumption display can be obtained. Furthermore, the acrylic elastomer has a simple structure made of only polymers. Therefore, by use of the acrylic elastomer, a display can be produced at low cost and easily increased in size. In addition, by using the IGZO TFT as the TFT 106, the display can be easily increased in size.

In the above configuration, the display panel 41 is not required to include a polarizer. Accordingly, as compared to a conventional liquid crystal display, light utilization efficiency can be improved and at the same time, a power consumption of the backlight can be reduced. This makes it possible to realize an extremely-low-power-consumption display. Further, a transparent display can be obtained because such a display panel 41 is a normally white display panel (transparent when the power supply is off).

(Regarding Configuration Including Color Filter)

FIG. 7 is a view illustrating a configuration of a case where the display panel 41 according to the first embodiment includes color filters. As illustrated in FIG. 7, each of the display elements 10 includes a color filter 108 between the upper electrode 103 and the transparent substrate 104. In an example illustrated in FIG. 7, the display panel 41 employs color filters 108(a), 108(b), and 108(c). The color filter 108(a) is an R (Red) filter, the color filter 108(b) is a G (Green) filter, and the color filter 108(c) is a B (Blue) filter. As illustrated in FIG. 7, the display elements each including a color filter 108 of any one of three colors RGB are provided so that three colors RGB each are periodically arranged. Further, a voltage applied to the soft material layer 101 of each of the display elements 10 is individually controlled. This makes it possible to realize a color image presentation.

As illustrated in FIG. 7, while no voltage is applied to the display elements 10 or a power supply is off, the soft material layer 101 of each of the display elements 10 has a minimum cross sectional area of a cross section in an xy plane. In this case, the display elements 10 respectively including the color filters 108 of RGB each have a maximum aperture ratio. Accordingly, brightness of an image displayed by the display panel 41 becomes maximum, and a white color that is a mixture of three colors of RGB is displayed.

In a state where a voltage of a value that causes a maximum deformation of the soft material layer 101 is applied to each of the display elements 10 (when a voltage is applied), the soft material layer 101 has a maximum cross sectional area of a cross section in an xy plane. In this case, light to pass through each of the display elements 10 respectively including the color filters 108 of RGB is blocked. Therefore, brightness of an image that is displayed by the display panel 41 becomes minimum. Further, hues and phases of pixel colors which are displayed by the display panel can be changed by individually controlling a value of voltage that is to be applied to each of the display elements 10.

(Effects of First Embodiment)

The first embodiment employs a display panel that includes (i) the soft material layer 101 that expands or contracts in accordance with a voltage applied to the soft material layer 101, and (ii) the upper electrode 103 that expands or contracts together with the soft material layer 101 in accordance with expansion or contraction of the soft material layer 101. The aperture ratio of the display panel is controlled by such expansion and contraction of the soft material layer 101. This makes it possible to realize a fast response, low cost, a larger size of the display panel 41.

<Second Embodiment>

Figure 8:
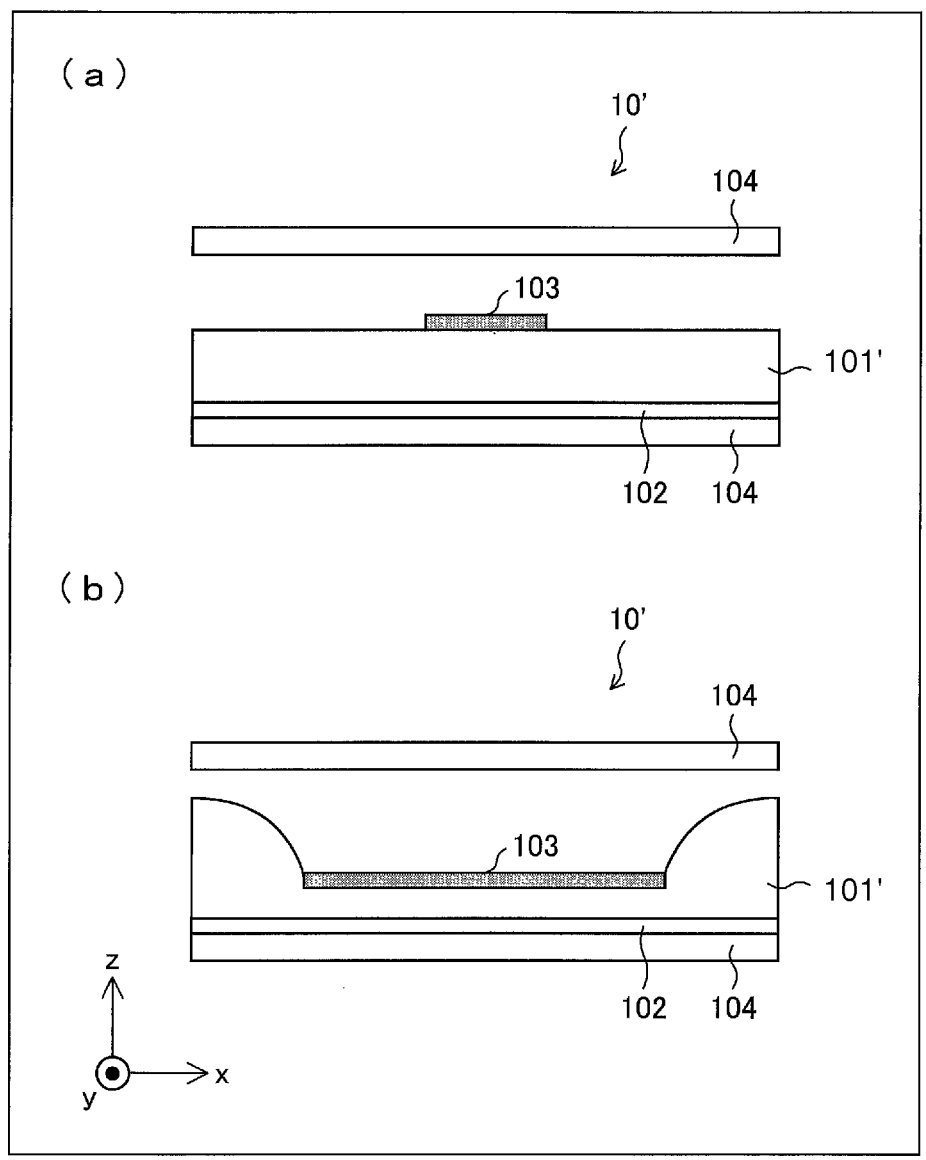
FIG. 8 is a view illustrating a configuration of a display element which is provided in a display panel according to the second embodiment of the present invention.
Figure 9:
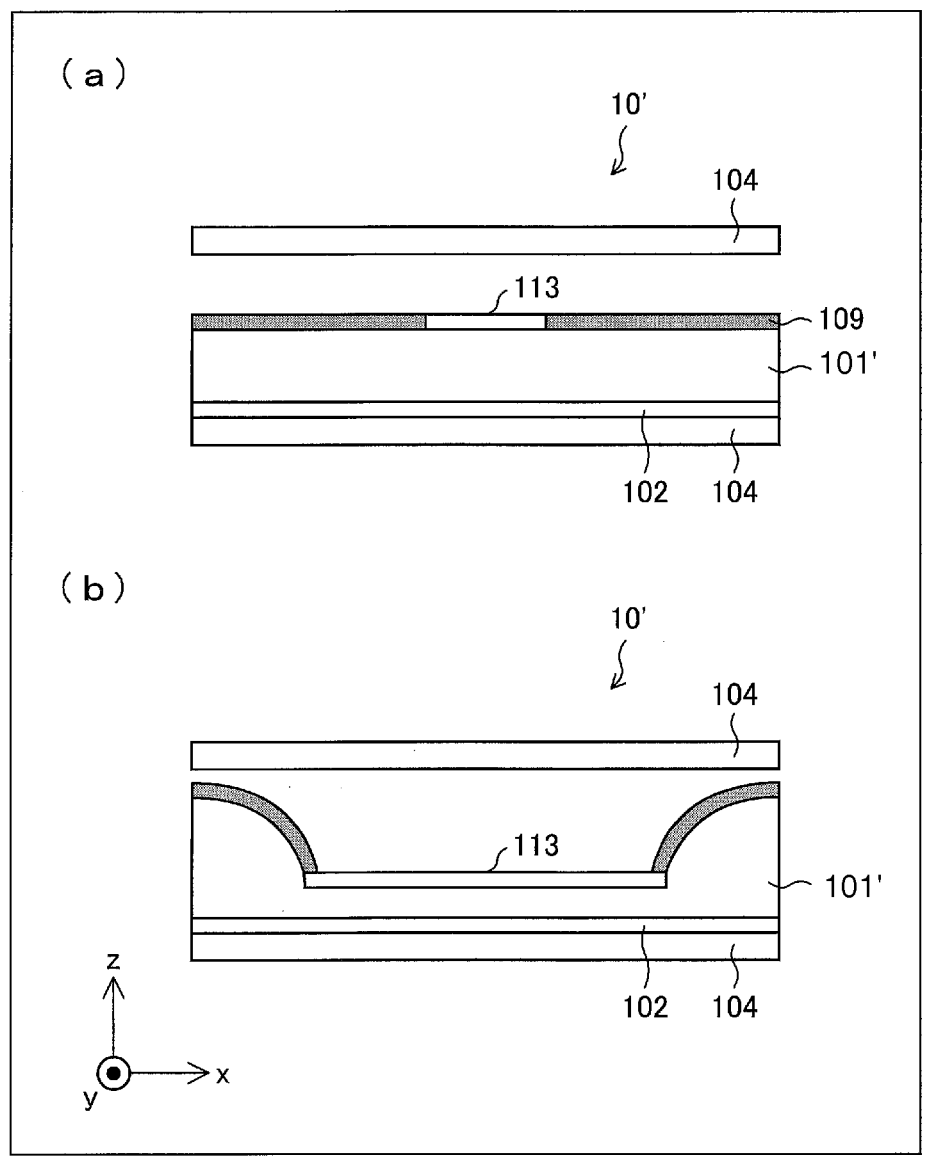
FIG. 9 is a view illustrating a modified example of a configuration of a display device which is provided in a display panel according to the second embodiment of the present invention.

The following discusses a display panel according to the second embodiment of the present invention, with reference to FIGS. 8 and 9. For convenience of explanation, members having identical functions to those of members in the first embodiment are given the same reference signs, respectively, and explanations thereof are omitted. The second embodiment mainly discusses a configuration of a display element 10' which configuration is a significant point of difference from the first embodiment.

(Configuration of Display Panel)

FIG. 8 is a cross sectional view schematically illustrating a configuration of the display element 10' provided in a display panel 41' according to the second embodiment. In FIG. 8, definitions of an x-axis direction, a y-axis direction, and a z-axis direction are the same as those in FIG. 1 of the first embodiment. As illustrated in (a) of FIG. 8, the display element 10' includes a soft material layer 101', a pixel electrode 102, an upper electrode 103, a transparent substrate 104 and a TFT substrate 105. The soft material layer 101', the pixel electrode 102, and the upper electrode 103 are provided between the transparent substrate 104 and the TFT substrate 105.

The upper electrode 103 is connected to an upper electrode line (not illustrated), and to this upper electrode line, a voltage is applied by the above-described upper electrode drive circuit 44.

As illustrated in (a) of FIG. 8, in the second embodiment, the soft material layer 101' has not been subjected to a patterning process. The soft material layer 101' is provided so as to be combined with a plurality of display elements 10'. In other words, in the display panel 41', a soft material layer 101' is provided so as to be combined with a display element 10' and another display element 10' adjacent to the display element 10'. The soft material layer 101' expands or contracts in a direction that is horizontal to the transparent substrate 104 (a direction parallel to an xy plane) in accordance with a voltage applied to the soft material layer 101', while keeping a substantially constant volume.

The upper electrode 103 is flexible and provided on an upper side of the soft material layer 101'. The upper electrode 103 is provided individually to each of the plurality of display elements 10'. The upper electrode 103 expands or contracts together with the soft material layer 101', in accordance with expansion or contraction of the soft material layer 101'.

The second embodiment employs, as the upper electrode 103, a non-transparent dye electrode. However, this configuration by no means limits the second embodiment. The second embodiment can be configured to employ a transparent electrode as the upper electrode as in a modified example described later.

(Behavior of Soft Material)

As illustrated in (a) of FIG. 8, in a state where no voltage is applied to the display elements 10', the non-transparent upper electrode 103 that expands or contracts together with the soft material layer 101' has a minimum cross sectional area of a cross section parallel to the xy plane. Accordingly, in such a state, an aperture ratio of the display element 10' becomes maximum. As a result, brightness of an image displayed by the display element 10' becomes maximum. In this way, the display panel including the display elements 10' is a normally white display panel whose aperture ratio becomes maximum in a state where no voltage is applied.

On the contrary, as illustrated in (b) of FIG. 8, in a state where a voltage that causes a maximum deformation of the soft material layer 101' is applied to the display element 10' (when a voltage is applied), only a portion of the soft material layer 101' in a region where the upper electrode 103 is provided expands locally in a direction parallel to the xy plane (in accordance with the above expansion or contraction, another portion of the soft material layer 101' in another region where the upper electrode 103 is not provided is pushed away by the portion that has expanded or contracted and as a result, expands in the z-axis direction). In this case, light to pass through the display element 10' is blocked by the upper electrode 103 that is a non-transparent dye electrode, so that brightness of an image displayed by the display element 10' becomes minimum.

A deformation amount of the soft material layer 101' provided in the display element 10' changes in accordance with an applied voltage value. A signal line drive circuit 46 applies, to the display element 10' via a corresponding source signal line S, a voltage of a value calculated based on an inputted image signal. Therefore, when an image having a desired brightness is to be displayed, a voltage in accordance with the desired brightness should be applied.

<Modified Example of Second Embodiment>

The following discusses one modified embodiment of the second embodiment, with reference to FIG. 9.

(Configuration of Display Panel)

(a) of FIG. 9 is a view illustrating a configuration in which a transparent electrode 113 is used in place of the upper electrode 103 in the second embodiment. As illustrated in (a) of FIG. 9, a non-transparent insulating dye 109 is provided on an upper side of a soft material layer 101' so as to be combined with the soft material layer 101'. This non-transparent insulating dye 109 covers a region except the transparent electrode 113. Respective behaviors of the soft material layer 101' and the upper electrode 103 are the same as those in the second embodiment. The transparent electrode 113 and the insulating dye 109 are flexible, and expand or contract together with the soft material layer 101' in accordance with expansion or contraction of the soft material layer 101'.

(Behavior of Soft Material)

In the above configuration, in a state where no voltage is applied to the soft material layer 101', the non-transparent insulating dye 109 has a maximum cross sectional area of a cross section parallel to an xy plane. In this case, light to pass through the display element 10' is blocked by the insulating dye 109. Accordingly, an aperture ratio of the display element 10' becomes minimum. In this case, brightness of an image displayed by the display element 10' becomes minimum. In this way, a display panel 41' including the display element 10' according to the present modified example is a normally black display panel.

Meanwhile, when a voltage is applied, the transparent electrode 113 has a maximum cross sectional area of a cross section parallel to the xy plane. Accordingly, an aperture ratio of the display element 10' becomes maximum. In this case, brightness of an image displayed by the display element 10' becomes maximum. A deformation amount of the soft material layer 101' provided in the display element 10' changes in accordance with an applied voltage value. A signal line drive circuit 46 applies, to the display element 10' via a corresponding source signal line S, a voltage of a value calculated based on an inputted image signal. Therefore, when an image having a desired brightness is to be displayed, a voltage in accordance with the desired brightness should be applied.

Effects of Second Embodiment

The second embodiment employs the display panel 41' that includes (i) the soft material layer 101' that expands or contracts in accordance with a voltage applied to the soft material layer 101', and (ii) the upper electrode 103 that expands or contracts together with the soft material layer 101' in accordance with expansion or contraction of the soft material layer 101'. The soft material layer 101' is provided so as to be combined with a plurality of display elements 10'. Accordingly, the second embodiment eliminates the necessity of a patterning process, and also realizes low cost and a larger size. Furthermore, a display color of the display panel 41' can be set to be transparent or non-transparent while a power supply is off, by use of a transparent or non-transparent dye electrode in place of the upper electrode 103. Therefore, the second embodiment is applicable to a transparent display etc.

<Third Embodiment>

Figure 10:
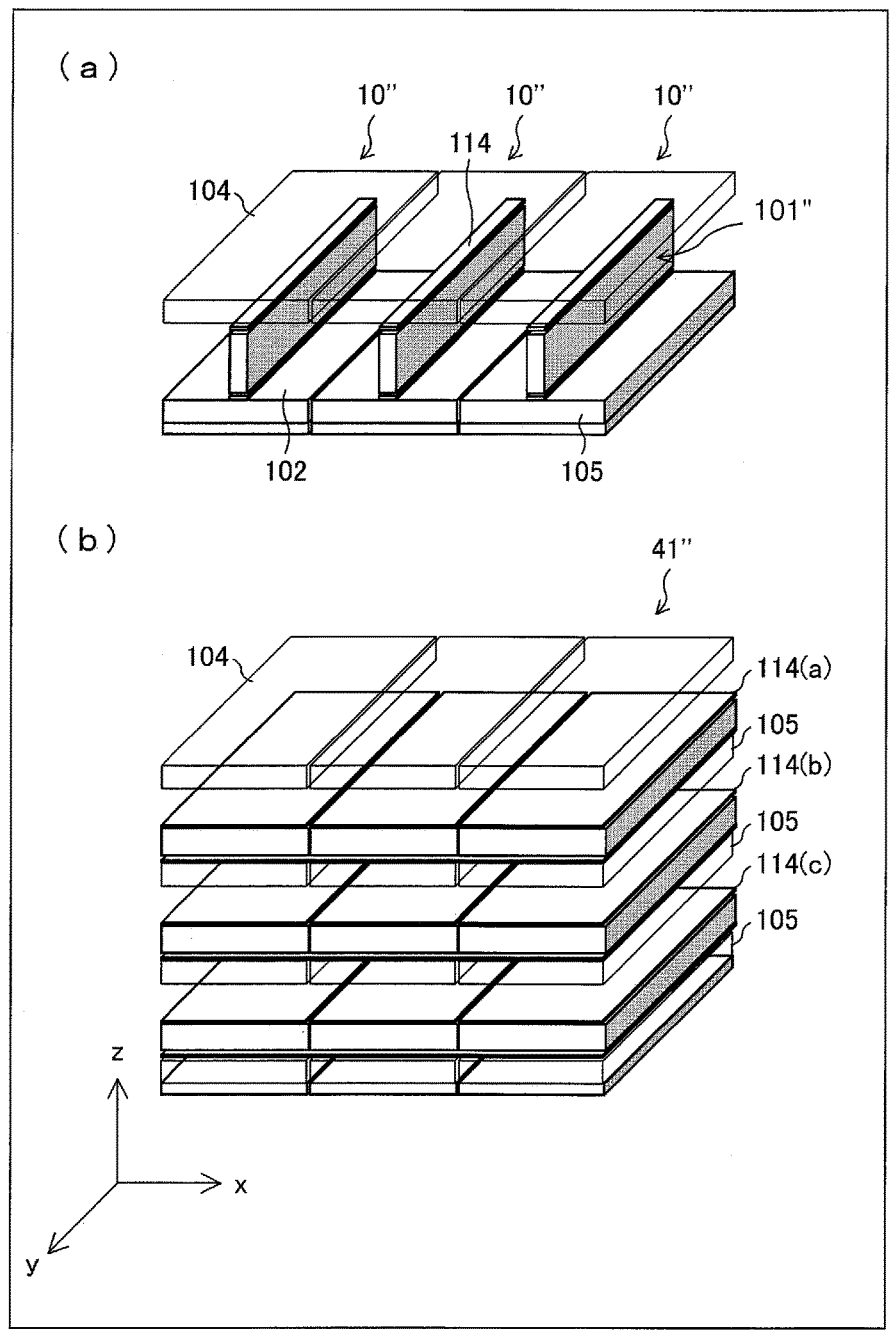
FIG. 10 is a view illustrating configurations of a display panel according to the third embodiment of the present invention and display elements that are provided in the display panel.

The following discusses a display panel according to the third embodiment of the present invention, with reference to FIG. 10. For convenience of explanation, members having identical functions to those of members in the first embodiment are given the same reference signs, respectively, and explanations thereof are omitted. The third embodiment mainly discusses a configuration of a display element 10" which configuration is a significant point of difference from the first embodiment.

(Configuration of Display Panel)

FIG. 10 is a perspective view schematically illustrating a configuration of a display panel 41" according to the third embodiment. In FIG. 10, definitions of an x-axis direction, y-axis direction, and a z-axis direction are the same as those in FIG. 2 of the first embodiment. As illustrated in (a) of FIG. 10, each of a plurality of display elements 10" provided in the display panel 41" includes a soft material layer 101", a pixel electrode 102, a dye electrode 114, a transparent substrate 104 and a TFT substrate 105. The soft material layer 101", the pixel electrode 102, and the upper electrode 103 are provided between the transparent substrate 104 and the TFT substrate 105. The upper electrode 103 is connected to an upper electrode line (also called as a counter electrode bus line), and to this upper electrode line, a voltage is applied by the above-described upper electrode drive circuit 44.

The display element 10" according to the third embodiment has a similar configuration to that of the first embodiment. However, the display element 10" includes, in place of the upper electrode 103, the dye electrode 114 of any one of three colors of C (Cyan), M (Magenta), and Y (Yellow).

As illustrated in (b) of FIG. 10, the display panel 41" has a structure in which display elements 10" including dye electrodes 114 of three different colors, respectively, are stacked in a z-direction. In an example illustrated in (b) of FIG. 10, dye electrodes 114(*a*), 114(*b*), and 114(*c*) are employed. The dye electrode 114(*a*) is a Cyan dye electrode, the dye electrode 114(*b*) is a Magenta dye electrode, and the dye electrode 114(*c*) is a Yellow dye electrode.

(Color Image Display)

In a state where no voltage is applied to the display elements 10" stacked in the display panel 41" (in a normal state, when a power supply is off), soft material layers 101" and dye electrodes 114 each has a minimum cross sectional area of a cross section parallel to an xy plane. Accordingly, an aperture ratio of each of the display element 10" becomes maximum. In this case, brightness of an image displayed by the display elements 10" becomes maximum. In this way, the display panel including the display elements 10" according to the third embodiment is a normally white display panel which has a maximum aperture ratio in a state where no voltage is applied.

On the contrary, as illustrated in (b) of FIG. 10, in a state where a voltage that causes a maximum deformation of the soft material layers 101" is applied to the display elements 10", the soft material layers 101" and the dye electrodes 114 each have a maximum cross sectional area of a cross section parallel to the xy plane. In this case, light to pass through each of the display elements 10" sequentially passes through the dye electrodes 114 provided in the display elements 10", respectively. Therefore, brightness of an image displayed by the display panel 41" becomes minimum.

A deformation amount of each of the soft material layers 101" provided in the display elements 10" changes in accordance with an applied voltage value. The signal line drive circuit 46 applies, to the display element 10" via a corresponding source signal line S, a voltage of a value calculated based on an inputted image signal. Accordingly, when an image having a desired brightness is to be displayed, a voltage in accordance with the desired brightness should be applied. Further, hues and phases of pixel colors which are displayed by the display panel can be changed by individually controlling a value of voltage that is to be applied to each of the display elements 10".

<Effects of Third Embodiment>

The third embodiment employs the display panel 41" that includes (i) the soft material layers 101" each of which expands or contracts in accordance with a voltage applied to the soft material layer 101" and (ii) the dye electrodes 114 each of which expands or contracts together with a corresponding soft material layer 101" in accordance with expansion or contraction of the soft material layer 101". In the third embodiment, the display panel 41" has a structure in which display elements 10" each including one of a plurality of dye electrodes 114 having different colors, respectively, are stacked. This makes it possible increase the aperture ratio threefold, as compared to an embodiment having a structure in which a display area is divided but layers are not stacked. This makes it possible to improve light utilization efficiency.

Further, the transparent substrate 104 is provided to an upper part of each of the display elements 10" while a transparent TFT substrate 105 is provided at a lower part of each of the display element 10". The display panel 41" according to the third embodiment has a structure in which the display elements 10" are stacked. This makes it possible to reduce the transparent substrate 104. More specifically, in an example illustrated in (b) of FIG. 10, a display element 10" including the Yellow dye electrode 114(*c*) is provided in a bottom layer. On top of this display element 10", another display element 10" including the Magenta dye electrode 114(*b*) is provided. Accordingly, the TFT substrate 105 at a lower part of the another display element 10" including the Magenta dye electrode 114(*b*) serves as a transparent substrate 104 at an upper part of the display element 10" including the Y dye electrode 114(*c*). Similarly, the transparent substrate 104 can be reduced by stacking the display element 10". This makes it possible to reduce production cost.

(Conclusion)

In order to solve the above problems, a display panel according to an aspect 1 of the present invention, includes: a plurality of gate bus lines; a plurality of source bus lines; and display elements each provided in a pixel area defined by given gate bus lines out of the plurality of gate bus lines and given source bus lines out of the plurality of source bus lines, the display elements each including: a transistor including a gate connected to one of the given gate bus lines, and a source connected to one of the given source bus lines; a first electrode connected to a drain of the transistor; a soft material provided in contact with the first electrode, the soft material expanding or contracting in accordance with a voltage applied to the soft material; and a second electrode provided so as to be combined with the soft material, the second electrode being provided on a side of the soft material which side is opposite to another side where the soft material is in contact with the first electrode.

The plurality of display elements provided in the display panel configured as above each individually include the second electrode that expands or shrinks together with the soft material that expends or contracts in response to voltage application. The display element changes in aperture ratio due to expansion or contraction of the second electrode that expands or contracts together with the soft material. The display panel according to the present invention does not require a polarizer. This makes it possible to obtain a higher light utilization efficiency and at the same time to reduce a power consumption. Further, voltage can be efficiently applied because the soft material and the second electrode are provided in a combined manner. This makes it possible to improve a response speed of the soft material.

Therefore, the display panel configured as described above makes it possible to realize a fast response, a high light utilization efficiency, and a low power consumption as well as avoiding complication of a production process.

Further, a display panel according to an aspect 2 of the present invention is preferably configured such that, in the aspect 1, the second electrode and the soft material are provided individually for each of the display elements.

The display panel configured as above can change brightness of an image displayed by each of the display elements, by separately controlling the second electrode and the soft material that are provided individually in each of the display elements.

Therefore, the display panel configured as described above makes it possible to suitably display an image by separately controlling each of the display elements.

Further, a display panel according to an aspect 3 of the present invention is preferably configured such that, in the aspect 2, the soft material is transparent; and the second electrode is non-transparent.

The display panel configured as above makes it possible to control an aperture ratio of the display panel by expansion or contraction of the non-transparent second electrode that expands or contracts together with the transparent soft material.

Therefore, the display panel configured as above makes it possible to suitably display an image.

Further, a display panel according to an aspect 4 of the present invention may be configured such that, in the aspect 1, the soft material is provided so as to be combined with two or more of the display elements; and the second electrode is provided individually for each of the display elements.

In the display panel configured as above, the soft material has not been subjected to a patterning process and is provided so as to be combined with two or more of the display elements. In other words, in the display panel, a soft material is provided so as to be combined with a display element and another display element adjacent to the display element. Each of the two or more display elements changes in aperture ratio due to expansion or contraction of the second electrode that expands or contracts together with the soft material.

Accordingly, the display panel configured as above eliminates the necessity of precise processing to the soft material and therefore, makes it possible to reduce cost and increase a size of the display panel.

A display panel according to an aspect 5 of the present invention is preferably configured such that, in the aspect 4, the soft material is transparent; and the second electrode is non-transparent.

In the display panel configured as above, the soft material has not been subjected to a patterning process and is provided so as to be combined with the two or more display elements. In other words, in the display panel, a soft material is provided so as to be combined with a display element and another display element adjacent to the display element. Each of the two or more elements changes in aperture ratio due to expansion or contraction of the second electrode that expands or contracts together with the soft material.

The display panel configured as above makes it possible to control the aperture ration of the display panel by expansion or contraction of the non-transparent second electrode that expands or contracts together with the transparent soft material. Therefore, in the display panel configured as above makes it possible to suitably display an image.

Further, a display panel according to an aspect 6 of the present invention may be configured to further include, in the aspect 4, a non-transparent layer covering a region except a region of the second electrode, the non-transparent layer being provided so as to be combined with the soft material, the non-transparent layer being provided on a side of the soft material layer which side is opposite to another side where the soft material is in contact with the first electrode, wherein the soft material and the second electrode are transparent.

The display panel configured as above makes it possible to control the aperture ratio of the display panel by expansion or contraction of the non-transparent second electrode that expands or contracts together with the transparent soft material. Therefore, the display panel configured as above makes it possible to suitably display an image.

Further, a display panel according to an aspect 7 of the present invention is preferably configured such that, in any of the aspects 1 to 6, the display elements include: a display element having a red color filter; a display element having a green color filter; and a display element having a blue color filter.

The display panel configured as above makes it possible to display a color image.

Further, a display panel according to an aspect 8 of the present invention may be configured by laminating the display panel according to the above aspect 2 or 4, in which the second electrode transmits cyan (C) light; the display panel according to the above aspect 2 or 4, in which the second electrode transmits magenta (M) light; and the display panel according to the above aspect 2 or 4, in which the second electrode transmits yellow (Y) light.

The display panel configured as above makes it possible to not only to improve the aperture ratio but also to display a color image.

Further, a display panel according to an aspect 9 of the present invention is preferably configured such that, in any one of the aspects 1 to 8, the transistor is a TFT (Thin Film Transistor) having a semiconductor layer made of an oxide semiconductor.

Oxide semiconductor TFTs are utilized in high-precision liquid crystal displays, organic EL displays, etc. and have characteristics such as a high carrier mobility, a small variation in characteristic, low material cost and low process cost.

Therefore, the display panel configured as above makes it possible not only to improve a response speed and a gray scale presentation but also to realize low cost.

Further, a display panel according to an aspect 10 of the present invention is preferably configured such that, in the aspect 9, the oxide semiconductor is an InGaZnO oxide semiconductor.

In the display panel configured as above, an IGZO TFT made with use of IGZO that is an InGaZnO oxide semiconductor allows applying a high voltage, because the IGZO TFT has a higher junction withstand voltage than an Si TFT. This makes it possible to improve display performance, in particular, a moving image display performance and a gray scale presentation.

Therefore, the display panel configured as above makes it possible to improve a response speed and a gray scale presentation.

A display panel according to an aspect 11 of the present invention is preferably configured such that, in any of the aspects 1 to 10, the soft material is made of a dielectric polymer EAP (Electro Active Polymer).

In the display panel configured as above, the dielectric polymer has a high response characteristic and a high expansion and contraction characteristic.

Therefore, the display panel configured as above makes it possible to improve a fast response and an aperture ratio, and realize a low power consumption.

A display panel according to an aspect 12 of the present invention is preferably configured such that in the aspect 11, the dielectric polymer is an acrylic elastomer.

The acrylic elastomer that is a dielectric polymer has a larger deformation amount as compared to other materials. Further, the acrylic elastomer is capable of making a faster response.

Therefore, the display panel configured as above makes it possible to improve a fast response, to further improve an aperture ratio, and to realize a low power consumption.

A display device according to an aspect 13 of the present invention is preferably configured to include the display panel according to any one of the aspects 1 to 12; and a light source for irradiating the display panel with light.

The display device configured as above utilizes a light source provided therein. This makes it possible to improve visibility in a dark place.

A display device according to an aspect 14 of the present invention may be configured to include the display panel according to any one of the aspects 1 to 12; and a reflector provided in parallel with the display panel.

The display device configured as above utilizes, as a light source, light that is present in a surrounding environment. This makes it possible to reduce a power consumption.

Further, a method according to an aspect 15 of the present invention for producing a display panel is a method for producing the display panel according to the aspect 1, including the step of: forming the second electrode and the soft material individually for each of the display elements.

This method for producing the display panel provides an effect similar to that of the above display panel. Further, a method according to an aspect 16 of the present invention is a method for producing the display panel according to the aspect 1, including the steps of: forming the soft material so as to be combined with two or more of the display elements; and forming the second electrode individually for each of the display elements.

This method for producing the display panel provides an effect similar to that of the above display panel.

Additional Matters

The present invention is not limited to the description of the embodiments above, but may be altered by a skilled person within the scope of the claims. An embodiment based on a proper combination of technical means disclosed in different embodiments is encompassed in the technical scope of the present invention. Further, a new technical feature can be formed by combining technical means disclosed in respective embodiments.

INDUSTRIAL APPLICABILITY

The display device of the present invention can be applied to various active matrix display devices, such as liquid crystal display devices, organic EL display devices, and electronic papers.

REFERENCE SIGNS LIST 10 display element (pixel)
101 soft material layer (soft material)
102 pixel electrode (first electrode, lower electrode)
103 upper electrode (second electrode, common electrode)
104 transparent substrate
105 TFT substrate
106 TFT (transistor)
107 insulating film
108 color filter
109 insulating dye
111 backlight module
112 reflector
113 transparent electrode
114 dye electrode
30 system-side control section
40 display device 41 display panel
42 timing controller
43 power supply circuit
44 upper electrode drive circuit
45 scanning line drive circuit
46 signal line drive circuit
50 electronic apparatus
61 oxide semiconductor (InGaZnO oxide semiconductor)
62 gate insulating film (GI)
63 transparent insulating film (JAS)
64 Pass
65 source electrode (SE)
66 etching stopper (ES)
67 Gate

The invention claimed is:

1. A display panel comprising:
a plurality of gate bus lines;
a plurality of source bus lines; and
display elements each provided in a pixel area defined by given gate bus lines out of the plurality of gate bus lines and given source bus lines out of the plurality of source bus lines,
the display elements each including:
a transistor including a gate connected to one of the given gate bus lines, and a source connected to one of the given source bus lines;
a first electrode connected to a drain of the transistor;
a soft material provided in contact with the first electrode, the soft material expanding or contracting in accordance with a voltage applied to the soft material;
a second electrode provided so as to be combined with the soft material, the second electrode being provided on a side of the soft material which side is opposite to another side where the soft material is in contact with the first electrode;
the soft material is provided so as to be combined with two or more of the display elements;
the second electrode is provided individually for each of the display elements;
the display panel further includes a non-transparent layer covering a region except a region of the second electrode, the non-transparent layer being provided so as to be combined with the soft material, the non-transparent layer being provided on a side of the soft material which side is opposite to another side where the soft material is in contact with the first electrode; and
the soft material and the second electrode are transparent.

2. The display panel as set forth in claim 1, wherein:
the display elements include:
a display element having a red color filter;
a display element having a green color filter; and
a display element having a blue color filter.

3. The display panel as set forth in claim 1, wherein:
the transistor is a TFT having a semiconductor layer made of an oxide semiconductor.

4. The display panel as set forth in claim 3, wherein:
the oxide semiconductor is an InGaZnO oxide semiconductor.

5. The display panel as set forth in claim 1, wherein:
the soft material is made of a dielectric polymer.

6. The display panel as set forth in claim 5, wherein the dielectric polymer is an acrylic elastomer.

7. A display device comprising:
the display panel as set forth in claim 1; and
a light source for irradiating the display panel with light.

8. A display device comprising:
the display panel as set forth in claim 1; and
a reflector provided in parallel with the display panel.

9. A method for producing the display panel as set forth in claim 1, comprising the steps of:
forming the soft material so as to be combined with two or more of the display elements; and
forming the second electrode individually for each of the display elements.

* * * * *